(12) United States Patent
Diedrich et al.

(10) Patent No.: US 10,913,396 B2
(45) Date of Patent: Feb. 9, 2021

(54) ADJUSTMENT OF VEHICLE REARVIEW MIRROR DISPLAYS

(71) Applicant: Ford Global Technologies, LLC, Dearborn, MI (US)

(72) Inventors: Jonathan Diedrich, Carleton, MI (US); Eric L. Reed, Livonia, MI (US); Adil Nizam Siddiqui, Farmington Hills, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 205 days.

(21) Appl. No.: 15/711,717

(22) Filed: Sep. 21, 2017

(65) Prior Publication Data

US 2019/0084481 A1   Mar. 21, 2019

(51) Int. Cl.
| | |
|---|---|
| *B60R 1/08* | (2006.01) |
| *B60R 1/00* | (2006.01) |
| *B60R 1/04* | (2006.01) |
| *B60R 1/12* | (2006.01) |

(52) U.S. Cl.
CPC ............... *B60R 1/08* (2013.01); *B60R 1/00* (2013.01); *B60R 1/04* (2013.01); *B60R 2001/1223* (2013.01); *B60R 2001/1253* (2013.01); *B60R 2300/20* (2013.01); *B60R 2300/202* (2013.01); *B60R 2300/30* (2013.01)

(58) Field of Classification Search
CPC .... B60R 1/08; B60R 1/00; B60R 1/04; B60R 2300/30; B60R 2300/20; B60R 2300/202; B60R 2001/1223; B60R 2001/1253; B60R 1/12; B60R 2001/1215

USPC ........................................................ 359/838
See application file for complete search history.

(56) References Cited

U.S. PATENT DOCUMENTS

| | | | |
|---|---|---|---|
| 6,916,100 B2 * | 7/2005 | Pavao ................. | B60Q 1/2665 359/841 |
| 7,006,129 B1 | 2/2006 | McClure | |
| 8,451,332 B2 | 5/2013 | Rawlings | |
| 8,749,633 B2 * | 6/2014 | Schofield ................. | B60R 1/04 348/148 |
| 9,238,434 B2 | 1/2016 | Eder et al. | |
| 9,403,484 B2 | 8/2016 | Brandt et al. | |
| 2002/0159013 A1 * | 10/2002 | Faris .................... | G02B 5/3016 349/124 |
| 2002/0175999 A1 * | 11/2002 | Mutobe .................... | B60R 1/00 348/148 |

(Continued)

FOREIGN PATENT DOCUMENTS

| | | | | |
|---|---|---|---|---|
| WO | WO 2017108990 A1 | 6/1917 | | |
| WO | WO-2014130049 A1 * | 8/2014 | .............. | B60R 1/00 |
| WO | WO-2017108990 A1 * | 6/2017 | .............. | B60R 1/00 |

*Primary Examiner* — Stephone B Allen
*Assistant Examiner* — Rahman Abdur
(74) *Attorney, Agent, or Firm* — Frank Lollo; Eversheds Sutherland (US) LLP (57) ABSTRACT

Method and apparatus are disclosed for adjustment of vehicle rearview mirror displays. An example vehicle includes a rearview camera for capturing an image, a rearview mirror display positioned at a fixed orientation that is to present a portion of the image, a housing to rotate behind the rearview mirror display, and a sensor to detect a orientation of the housing. The example vehicle also includes a controller to adjust, based upon the orientation of the housing, the portion of the image presented via the rearview mirror display.

20 Claims, 7 Drawing Sheets

(56) References Cited

U.S. PATENT DOCUMENTS

| | | | |
|---|---|---|---|
| 2005/0225633 A1 | 10/2005 | Diederiks et al. | |
| 2009/0309003 A1* | 12/2009 | Ohashi | B60R 1/04 |
| | | | 248/484 |
| 2011/0095974 A1* | 4/2011 | Moriwaki | G09G 3/007 |
| | | | 345/156 |
| 2016/0185297 A1* | 6/2016 | Boehm | B60R 1/12 |
| | | | 348/148 |
| 2016/0375830 A1* | 12/2016 | Karner | B29C 45/0017 |
| | | | 348/148 |

* cited by examiner

FIG. 7

ADJUSTMENT OF VEHICLE REARVIEW MIRROR DISPLAYS

TECHNICAL FIELD

The present disclosure generally relates to rearview mirror displays and, more specifically, to adjustment of vehicle rearview mirror displays.

BACKGROUND

Generally, a vehicle includes mirrors to facilitate a driver in viewing a surrounding area of the vehicle. Oftentimes, a vehicle includes a rearview mirror that is coupled a windshield of the vehicle and facilitates a driver in viewing an area behind the vehicle. A vehicle also oftentimes includes side-view mirrors (also known as side mirrors, wing mirrors, fender mirrors) that are coupled to corresponding doors of the vehicle and facilitate a driver in viewing an area to the side of and/or behind the vehicle. Typically, each rearview and side-view mirror of a vehicle includes a reflective layer (e.g., formed of metallic material) that enables a driver to view an area to the side of and/or behind the vehicle via the mirror.

SUMMARY

The appended claims define this application. The present disclosure summarizes aspects of the embodiments and should not be used to limit the claims. Other implementations are contemplated in accordance with the techniques described herein, as will be apparent to one having ordinary skill in the art upon examination of the following drawings and detailed description, and these implementations are intended to be within the scope of this application.

Example embodiments are shown for adjustment of vehicle rearview mirror displays. An example disclosed vehicle includes a rearview camera for capturing an image, a rearview mirror display positioned at a fixed orientation that is to present a portion of the image, a housing to rotate behind the rearview mirror display, and a sensor to detect a orientation of the housing. The example disclosed vehicle also includes a controller to adjust, based upon the orientation of the housing, the portion of the image presented via the rearview mirror display.

An example disclosed method includes capturing an image via a rearview mirror and presenting a portion of the image via a rearview mirror display that is positioned at a fixed orientation. The example disclosed method includes detecting, via a sensor, an orientation of a housing that is configured to rotate behind the rearview mirror display and adjusting, via a processor, the portion of the image presented via the rearview mirror display based upon the orientation of the housing.

BRIEF DESCRIPTION OF THE DRAWINGS

For a better understanding of the invention, reference may be made to embodiments shown in the following drawings. The components in the drawings are not necessarily to scale and related elements may be omitted, or in some instances proportions may have been exaggerated, so as to emphasize and clearly illustrate the novel features described herein. In addition, system components can be variously arranged, as known in the art. Further, in the drawings, like reference numerals designate corresponding parts throughout the several views.

DETAILED DESCRIPTION OF EXAMPLE EMBODIMENTS

While the invention may be embodied in various forms, there are shown in the drawings, and will hereinafter be described, some exemplary and non-limiting embodiments, with the understanding that the present disclosure is to be considered an exemplification of the invention and is not intended to limit the invention to the specific embodiments illustrated.

Generally, a vehicle includes mirrors to facilitate a driver in viewing a surrounding area of the vehicle. Oftentimes, a vehicle includes a rearview mirror that is coupled a windshield of the vehicle and facilitates a driver in viewing an area behind the vehicle. A vehicle also oftentimes includes side-view mirrors (also known as side mirrors, wing mirrors, fender mirrors) that are coupled to corresponding doors of the vehicle and facilitate a driver in viewing an area to the side of and/or behind the vehicle. Typically, each rearview and side-view mirror of a vehicle includes a reflective layer (e.g., formed of metallic material) that enables a driver to view an area to the side of and/or behind the vehicle via the mirror.

Recently some vehicles include a rearview mirror display (e.g., a liquid crystal display (LCD)) that provide image(s) and/or video captured by a vehicle camera of an area behind the vehicle. A rearview mirror display may be positioned and shaped in a manner similar to that of a traditional rearview mirror. In some instances, a rearview mirror display potentially may provide a clearer image of an area behind a vehicle relative to a traditional rearview mirror as a result of providing a view of the area behind the vehicle that is not partially obstructed by a frame of the vehicle and/or objects located within a cabin of the vehicle. Some rearview mirror displays include buttons to enable a driver to adjust what portion of the area behind the vehicle is being displayed. In some instances, a driver may potentially find adjusting an image presented via a rearview mirror display unintuitive.

Example methods and apparatus disclosed herein includes a rearview display system that enables a vehicle operator and/or other vehicle occupant to intuitively adjust a region-of-interest that is presented via a rearview mirror display by rotating the rearview mirror display and/or a housing of the rearview mirror display. Examples disclosed herein include a rearview mirror display of a vehicle that presents a region-of-interest located behind the vehicle. The rearview mirror display is coupled to the window and is shaped in a manner similar to that of a traditional rearview mirror. The region-of-interest presented via the rearview mirror display is included in an image that is captured by a rearview camera of the vehicle. Based upon a detected rotation of the rearview mirror display and/or the display housing, a controller adjusts the region-of-interest that is presented on the rearview mirror display by performing a pixel shift count of the region-of-interest within the image captured rearview camera. The vehicle includes one or more sensors to detect a magnitude, a direction, and/or an orientation of the rearview mirror display and/or a housing of the rearview mirror display is adjusted. The pixel shift count has a magnitude and a direction that corresponds to a degree and direction of rotation of the rearview mirror display and/or the housing of the rearview mirror display.

Figure 1:
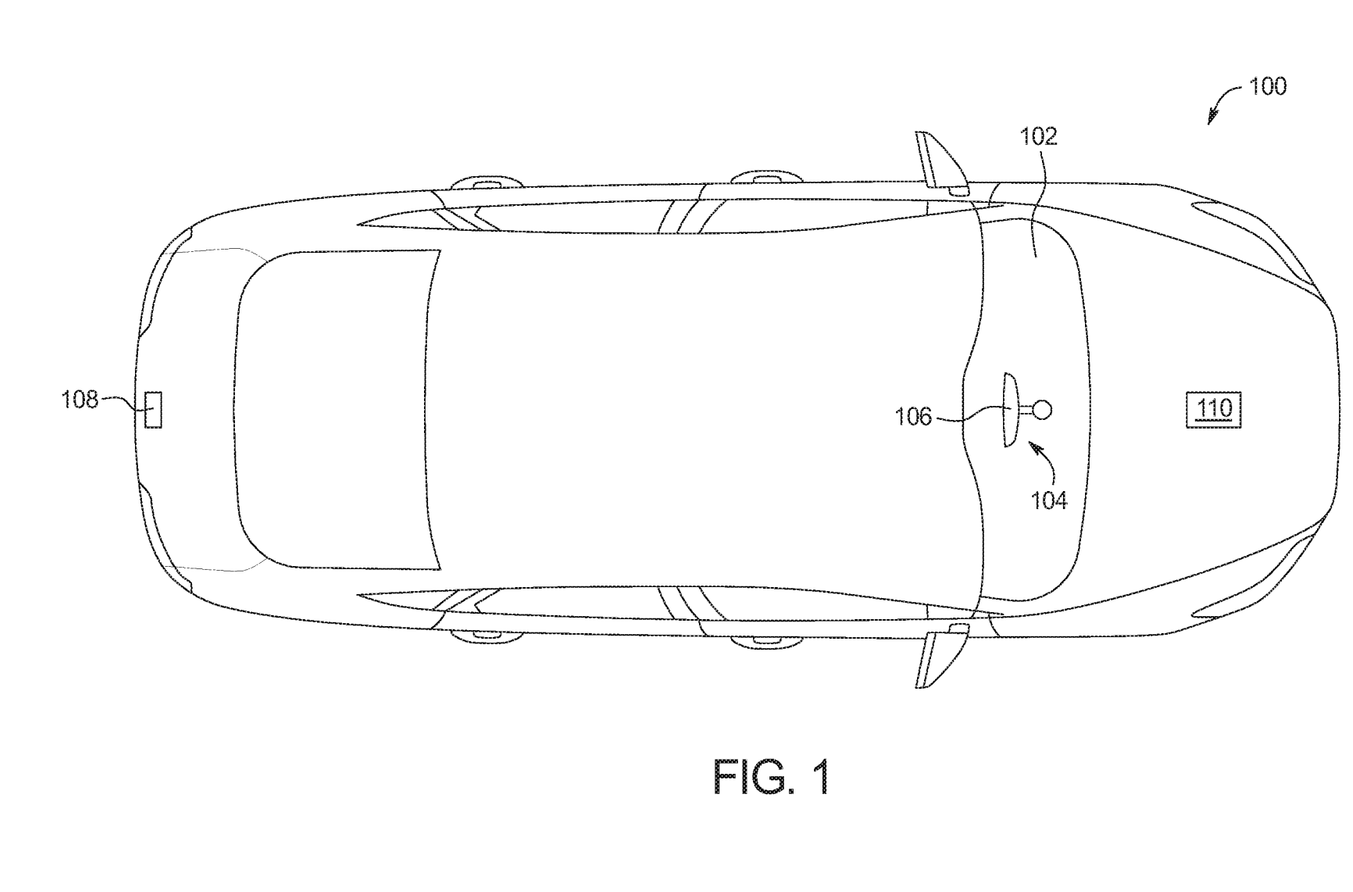
FIG. 1 illustrates an example vehicle in accordance with the teachings herein.

Turning to the figures, FIG. 1 illustrates an example vehicle 100 in accordance with the teachings herein. The vehicle 100 may be a standard gasoline powered vehicle, a hybrid vehicle, an electric vehicle, a fuel cell vehicle, and/or any other mobility implement type of vehicle. The vehicle 100 includes parts related to mobility, such as a powertrain with an engine, a transmission, a suspension, a driveshaft, and/or wheels, etc. The vehicle 100 may be non-autonomous, semi-autonomous (e.g., some routine motive functions controlled by the vehicle 100), or autonomous (e.g., motive functions are controlled by the vehicle 100 without direct driver input). In the illustrated example, the vehicle 100 includes a windshield 102 and a rearview display system 104.

The windshield 102 enables the vehicle operator and/or other occupant(s) of the vehicle 100 to view an area in front of the vehicle 100. For example, the windshield 102 is formed of laminated glass to deter the windshield from shattering. In other examples, the windshield 102 may be formed non-laminated, tempered glass.

The rearview display system 104 of the illustrated example includes a rearview mirror display 106, a rearview camera 108, and a rearview controller 110. For example, the rearview controller 110 of the rearview display system 104 presents, via the rearview mirror display 106, image(s) and/or video of an area behind the vehicle 100 that are captured by the rearview camera 108.

In the illustrated example, the rearview camera 108 is positioned toward a rear of the vehicle 100 to enable the rearview camera 108 to capture image(s) and/or video of the area behind the vehicle 100. In other examples, the rearview camera 108 may be located at any other position of the vehicle 100 that enables the rearview camera 108 to capture an unobstructed view of the area behind the vehicle 100. Further, in some examples, the rearview camera 108 is a wide-view camera that includes a wide-angle lens. The rearview camera 108 includes a wide-angle lens to enable the rearview camera 108 to capture a greater region of the area behind the vehicle 100 relative to a standard lens. For example, a wide-angle lens enables the rearview camera 108 to have an angle-of-view behind the vehicle 100 of about between 64 degrees and 84 degrees.

The rearview mirror display 106 is coupled to the windshield 102 and is shaped in a manner similar to that of a traditional rearview mirror. In the illustrated example, the rearview mirror display 106 presents at least a portion of the image(s) and/or video captured by the rearview camera 108. For example, the rearview mirror display 106 presents a region-of-interest (e.g., a region-of-interest 406 of FIGS. 4B and 4C) of the vehicle operator. That is, the rearview mirror display 106 presents a view of the area behind the vehicle 100 to the vehicle operator that is not obstructed by a frame of the vehicle 100 and/or objects (e.g., rear-seat occupants) located within a cabin of the vehicle 100. The rearview mirror display 106 includes, for example, a liquid crystal display (LCD), an organic light emitting diode (OLED) display, a flat panel display, a solid state display, and/or any other display that is capable of presenting at least a portion of the image(s) and/or video captured by the rearview camera 108 to occupant(s) of the vehicle 100. In some examples, the rearview mirror display 106 includes an LCD display and/or other electronic display positioned behind a semi-transparent mirror surface (e.g., a one-way mirror) such that the semi-transparent mirror surface functions as a mirror when the electronic display is not emitting light and the electronic display emits an image and/or video through the semi-transparent mirror surface when the electronic display is emitting light.

The rearview controller 110 presents, via the rearview mirror display 106, a portion of image(s) and/or video captured by the rearview camera 108. Further, the rearview controller 110 of the illustrated example determines which portion of the image(s) and/or video captured by the rearview camera 108 to present via the rearview mirror display 106. For example, the rearview controller 110 identifies a region-of-interest (e.g., the region-of-interest 406) within an image captured by the rearview camera 108 that is to be displayed via the rearview mirror display 106 based upon an orientation at which the vehicle operator positions the rearview mirror display 106 and/or a housing (e.g., a display housing 206 of FIG. 2) of the rearview mirror display 106. That is, the rearview controller 110 adjusts the region-of-interest presented via the rearview mirror display 106 based on the orientation of the rearview mirror display 106 in a manner that is similar to a reflected image being adjusted based on the orientation of a traditional rearview mirror. As a result, the rearview controller 110 enables the vehicle operator to intuitively adjust the region-of-interest presented via the rearview mirror display 106 by adjusting the orientation of the rearview mirror display 106 and/or the housing of the rearview mirror display 106 (e.g., the vehicle operator rotates the rearview mirror display 106 and/or the housing leftward to shift or pan the presented image leftward, rightward to shift or pan the presented image rightward, downward to shift or pan the presented image downward, and upward to shift or pan the presented image upward).

Figure 2:
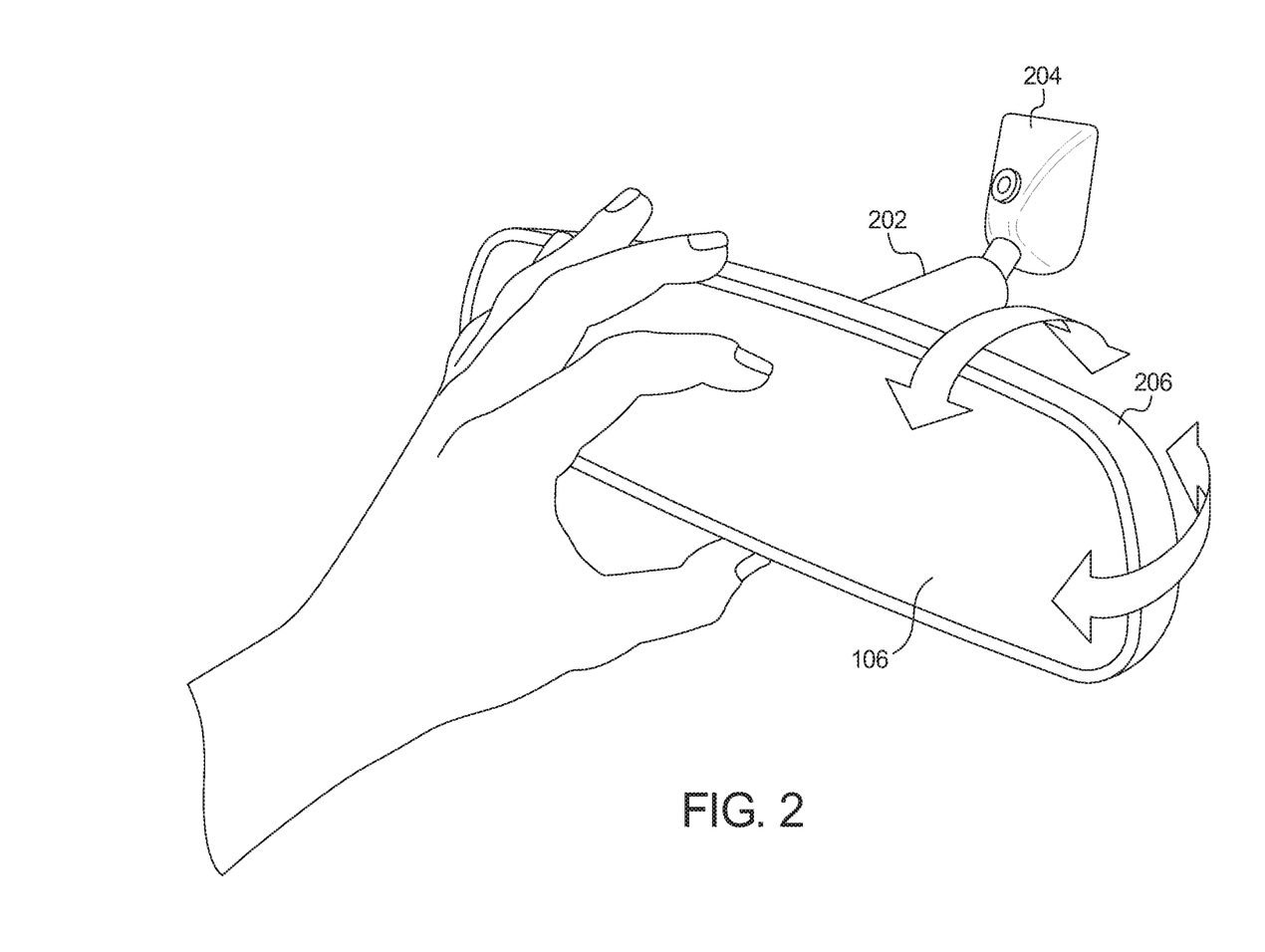
FIG. 2 illustrates a rearview mirror display an example rearview display system of the vehicle of FIG. 1.

FIG. 2 illustrates an example of the rearview display system 104 of the vehicle 100. As illustrated in FIG. 2, the rearview display system 104 includes the rearview mirror display 106, an arm 202, a base 204, and a housing or display housing 206. The rearview mirror display 106 of the illustrated example is coupled the windshield 102 of the vehicle 100 via the arm 202 and the base 204. For example, the base 204 is fixed to the windshield 102 (e.g., via an adhesive) and the arm 202 is connected to the rearview mirror display 106 and the base 204 to couple the rearview mirror display 106 to the windshield 102.

In the illustrated example, the rearview mirror display 106 is positioned at a fixed orientation and a fixed position via the arm 202 and the base 204. That is, the arm 202 that couples the rearview mirror display 106 to the windshield 102 is immobile to prevent an orientation and/or position of the rearview mirror display 106 from being adjusted. As a result, a vehicle operator and/or other occupant of the vehicle 100 is unable to adjust an orientation and/or position of the rearview mirror display 106. In some examples, the rearview mirror display 106 being positioned at a fixed orientation and a fixed position reduces an amount of glare on the rearview mirror display 106 to facilitate the vehicle operator in viewing an image presented via the rearview mirror display 106. Additionally or alternatively, the rearview mirror display 106 being positioned at a fixed orientation and a fixed position reduces a parallax effect of an image presented via the rearview mirror display 106 to facilitate the vehicle operator in observing the image presented via the rearview mirror display 106.

As illustrated in FIG. 2, the display housing 206 is located behind the rearview mirror display 106. For example, the display housing 206 at least partially surrounds the rearview mirror display 106 to provide a smooth surface that a vehicle operator may grasp to adjust a region-of-interest (e.g., a region-of-interest 406 of FIGS. 4B and 4C) being presented via the rearview mirror display 106. Additionally or alternatively, the display housing 206 at least partially encloses a back portion of the rearview mirror display 106 to deter the rearview mirror display 106 from being damaged from other objects.

In the illustrated example, the display housing 206 is rotatably coupled to the arm 202 to enable the display housing 206 to rotate behind the rearview mirror display 106. That is, the display housing 206 is configured to rotate about the back portion of the rearview mirror display 106 to adjust an orientation of the display housing 206 relative to the rearview mirror display 106. The rearview controller 110 identifies, via one or more sensors (e.g., one or more sensors 306 of FIGS. 3A and 3B), an orientation of the display housing 206 relative to the rearview mirror display 106 and adjusts the region-of-interest that is presented via the rearview mirror display 106 based upon the identified orientation.

Figure 3A:
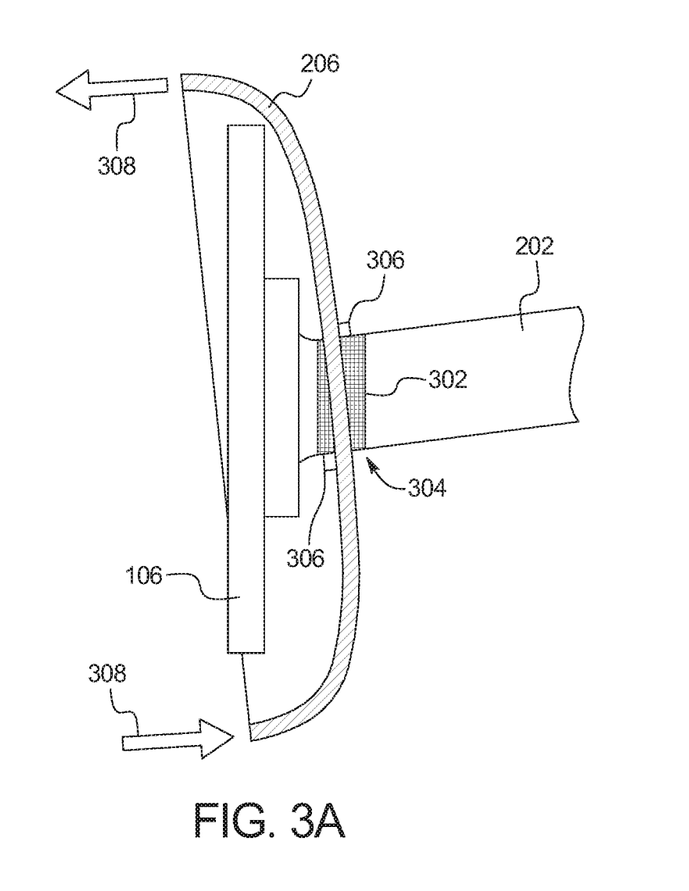
FIG. 3A depicts a side view of the rearview mirror display of FIG. 2.
Figure 3B:
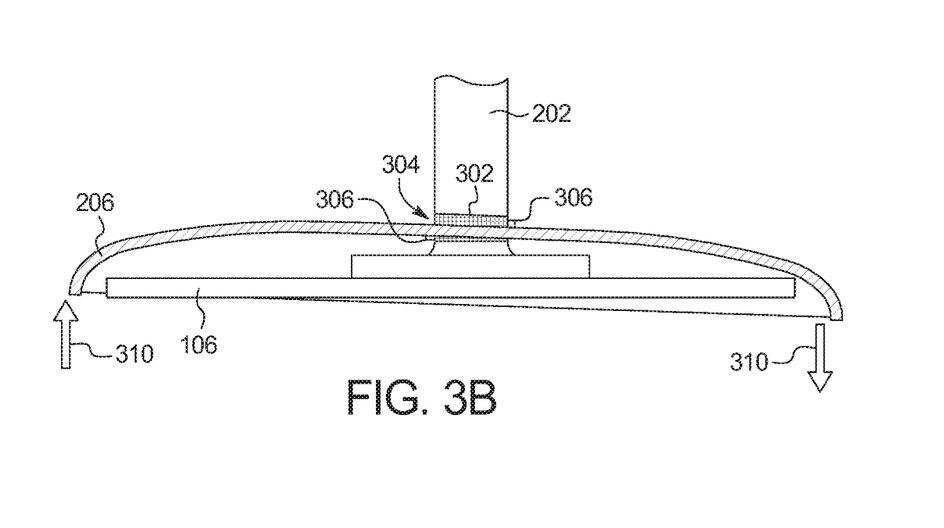
FIG. 3B depicts a top view of the rearview mirror display of FIG. 2.

FIGS. 3A and 3B further depict the rearview display system 104. More specifically, FIG. 3A is a side view of the rearview display system 104, and FIG. 3B is a top view of the rearview display system 104. As illustrated in FIGS. 3A and 3B, the orientation and position of the rearview mirror display 106 is fixed via the arm 202 that is immobile and couples the rearview mirror display 106 to the windshield 102. Further, the display housing 206 is rotatably coupled to the arm 202 adjacent to a back portion of the rearview mirror display 106 to enable the display housing 206 to rotate behind the rearview mirror display 106 relative to the fixed position and orientation of the rearview mirror display 106.

In some examples, the display housing 206 is at least partially formed of flexible material. For example, the portion of the display housing 206 that engages the arm 202 to couple to the arm 202 includes the flexible material to enable an orientation of the display housing 206 to be adjusted relative to the arm 202 and, thus, the rearview mirror display 106. Additionally or alternatively as illustrated in FIGS. 3A and 3B, the display housing 206 defines teeth 302 (e.g., a first set of teeth) and the arm 202 defines teeth 304 (e.g., a second set of teeth). The teeth 302 of the display housing 206 and the teeth 304 of the arm 202 mesh together to position the display housing 206 behind the rearview mirror display 106 and to enable an orientation of the display housing 206 to rotate behind the rearview mirror display 106. That is, the display housing 206 includes the flexible material, the teeth 302, and/or any other structure that enables the display housing 206 to rotatably couple to the arm 202 behind the rearview mirror display 106.

Further, as illustrated in FIGS. 3A and 3B, the rearview display system 104 also includes one or more sensors 306 that detect an orientation of the display housing 206 relative to the rearview mirror display 106 and/or the arm 202. For example, the rearview controller 110 adjusts, based on the orientation of the display housing 206 detected via the sensors 306, a region-of-interest (e.g., a region-of-interest 406 of FIGS. 4B and 4C) behind the vehicle 100 that is presented via the rearview mirror display 106. In the illustrated example, one or more of the sensors 306 are coupled to the arm 202 and/or the display housing 206 to detect the orientation of the display housing 206 relative to the arm 202 and/or the rearview mirror display 106. Additionally or alternatively, one or more of the sensors 306 are coupled to the back portion of the rearview mirror display 106 and/or are positioned at any other location that enables the one or more of the sensors 306 to measure the orientation of the display housing 206 relative to the arm 202 and/or the rearview mirror display 106.

In FIG. 3A, the display housing 206 is rotated by a vehicle operator (e.g., a driver) and/or other occupant in a downward direction 308 relative to the rearview mirror display 106. In operation, one or more of the sensors 306 detects the rotation (e.g., the change in orientation) in the downward direction 308 and measures a magnitude (e.g., in degrees) of the rotation in the downward direction 308. In turn, the rearview controller 110 adjusts the region-of-interest 406 presented via the rearview mirror display 106 by shifting the region-of-interest 406 in a downward direction within an image (e.g., an image 402 of FIG. 4A) captured by the rearview camera 108 by a magnitude that corresponds with the measure magnitude of rotation of the display housing 206. Likewise, in response to one or more of the sensors 306 detecting rotation of the display housing 206 in an upward direction, the rearview controller 110 adjusts the region-of-interest 406 that is presented via the rearview mirror display 106 by shifting the region-of-interest 406 in an upward direction by a magnitude that corresponds with the measure magnitude of rotation of the display housing 206.

In FIG. 3B, the display housing 206 is rotated by the vehicle operator and/or other occupant in a leftward direction 310 relative to the rearview mirror display 106. In operation, one or more of the sensors 306 detects the rotation in the leftward direction 310 and measures a magnitude of the rotation in the leftward direction 310. In turn, the rearview controller 110 adjusts the region-of-interest 406 presented via the rearview mirror display 106 by shifting the region-of-interest 406 in a leftward direction within the image captured by the rearview camera 108 by a magnitude that corresponds with the measure magnitude of rotation of the display housing 206. Likewise, in response to one or more of the sensors 306 detecting rotation of the display housing 206 in a rightward direction, the rearview controller 110 adjusts the region-of-interest 406 that is presented via the rearview mirror display 106 by shifting the region-of-interest 406 in rightward direction by a magnitude that corresponds with the measure magnitude of rotation of the display housing 206.

Figure 4A:
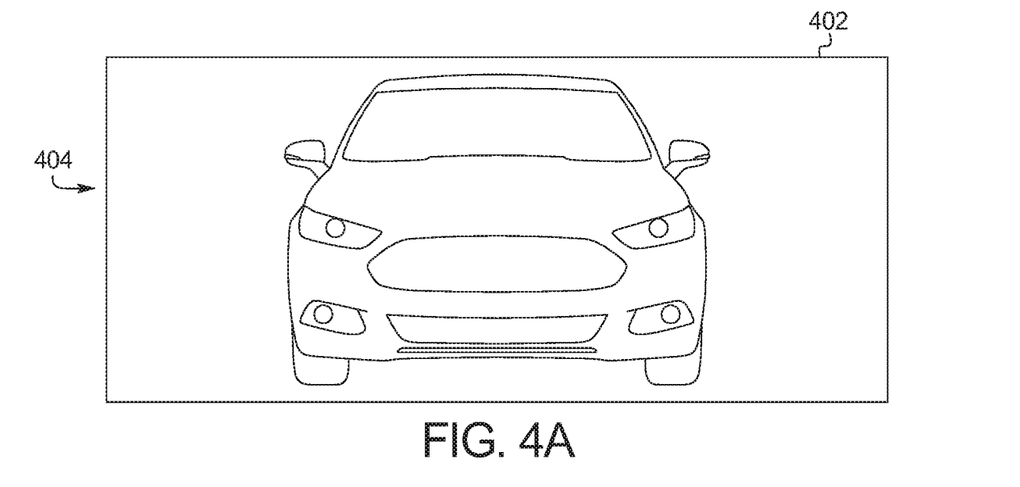
FIG. 4A is an image captured by a rearview camera of the vehicle of FIG. 1.
Figure 4B:
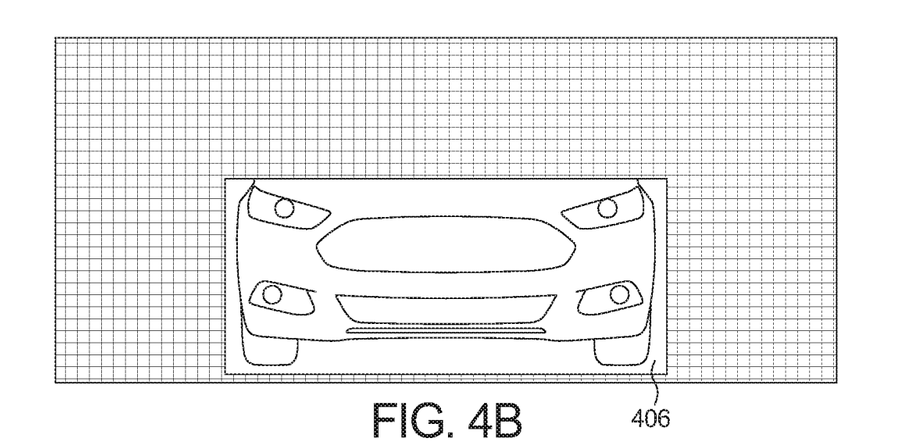
FIG. 4B depicts an example region-of-interest of the image of FIG. 4A that is presented via the rearview mirror display of FIG. 2.
Figure 4C:
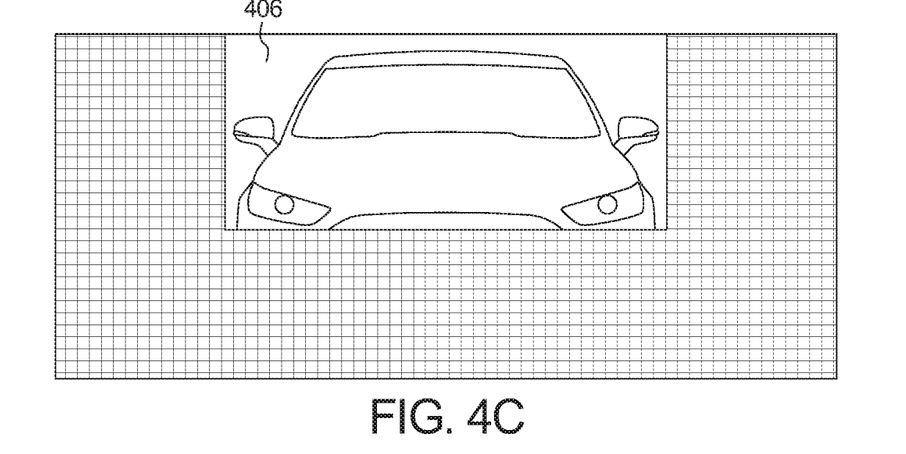
FIG. 4C depicts another example region-of-interest that is presented via the rearview mirror display of FIG. 2.

FIG. 4A depicts an image 402 captured by the rearview camera 108. Further, FIGS. 4B and 4C illustrate regions-of-interest that are presented via the rearview mirror display 106. More specifically, FIG. 4B depicts a region-of-interest 406 (e.g., a first region-of-interest) at a first position within the image 402, and FIG. 4C depicts the region-of-interest 406 (e.g., a second region-of-interest) at a second position within the image 402.

As illustrated in FIG. 4A, the rearview camera 108 captures the image 402 of an area behind the vehicle 100. In the illustrated example, the image 402 identifies another vehicle trailing the vehicle 100. Further, the image 402 is a digital image that includes a plurality of pixels 404 arranged in rows and columns. For example, the rearview camera 108 is a digital camera that captures digital image(s) and/or video (e.g., the image 402).

FIG. 4B depicts a portion of the image 402 that is presented via the rearview mirror display 106. The portion of the image 402 corresponds to a region-of-interest 406 behind the vehicle 100 of an operator (e.g., a driver) and/or other occupant of the vehicle 100. As illustrated in FIG. 4B, the region-of-interest 406 is smaller than the image 402 and is formed by a portion of the plurality of pixels 404 of the image 402. That is, the rearview mirror display 106 presents a portion of the image 402 (e.g., the region-of-interest 406) that is captured by the rearview camera 108.

The portion of the image 402 (e.g., the region-of-interest 406) that is presented via the rearview mirror display 106 is based upon the detected orientation of the display housing 206. In the illustrated example, the rearview controller 110 has formed the region-of-interest 406 from a lower portion of the image 402 in response to one or more of the sensors 306 detecting that the display housing 206 has been positioned in a downward orientation. Further, the rearview controller 110 is to form the region-of-interest 406 from an upper portion of the image 402 in response to one or more of the sensors 306 detecting that the display housing 206 has been positioned in a upward orientation. The rearview controller 110 is to form the region-of-interest 406 from a left portion of the image 402 in response to one or more of the sensors 306 detecting that the display housing 206 has been positioned in a leftward orientation. The rearview controller 110 is to form the region-of-interest 406 from a right portion of the image 402 in response to one or more of the sensors 306 detecting that the display housing 206 has been positioned in a rightward orientation.

FIG. 4C depicts the region-of-interest 406 that has shifted within the image 402 relative to that of FIG. 4B. More specifically, the rearview controller 110 has shifted the region-of-interest 406 upward within the image 402 captured by the rearview camera 108 in response to one or more of the sensors 306 detecting that the display housing 206 has been rotated upward. That is, the rearview controller 110 pans the region-of-interest 406 in a direction within the image 402 responsive to one or more of the sensors 306 detecting that the display housing 206 has been rotated in that direction (e.g., the region-of-interest 406 is panned upward when the display housing 206 is rotated upward, downward when the display housing 206 is rotated downward, leftward when the display housing 206 is rotated leftward, and/or rightward when the display housing 206 is rotated rightward).

To adjust the region-of-interest 406 that is presented via the rearview mirror display 106, the rearview controller 110 performs a shift count of the portion of the plurality of pixels 404 that form the region-of-interest 406 within the image 402. In some examples, the pixel shift count performed by the rearview controller 110 is calibrated to correspond linearly to a rotation of the display housing 206 measured by the one or more of the sensors 306. That is, each degree of rotation of the display housing 206 corresponds to a predefined number of pixels (e.g., 1 degree of rotation corresponds to 2 shifted pixels, 2 degrees of rotation corresponds to 4 shifted pixels, 3 degrees of rotation corresponds to 6 shifted pixels, etc.). In other examples, the pixel shift count performed by the rearview controller 110 is calibrated to correspond non-linearly to a rotation of the display housing 206 measured by the one or more of the sensors 306. That is, greater degrees of rotation of the display housing 206 correspond to greater shift count rates within the image 402. For example, 1 degree of rotation corresponds to 1 shifted pixels, 2 degrees of rotation corresponds to 3 shifted pixels, 3 degrees of rotation corresponds to 6 shifted pixels, etc.).

Figure 5:
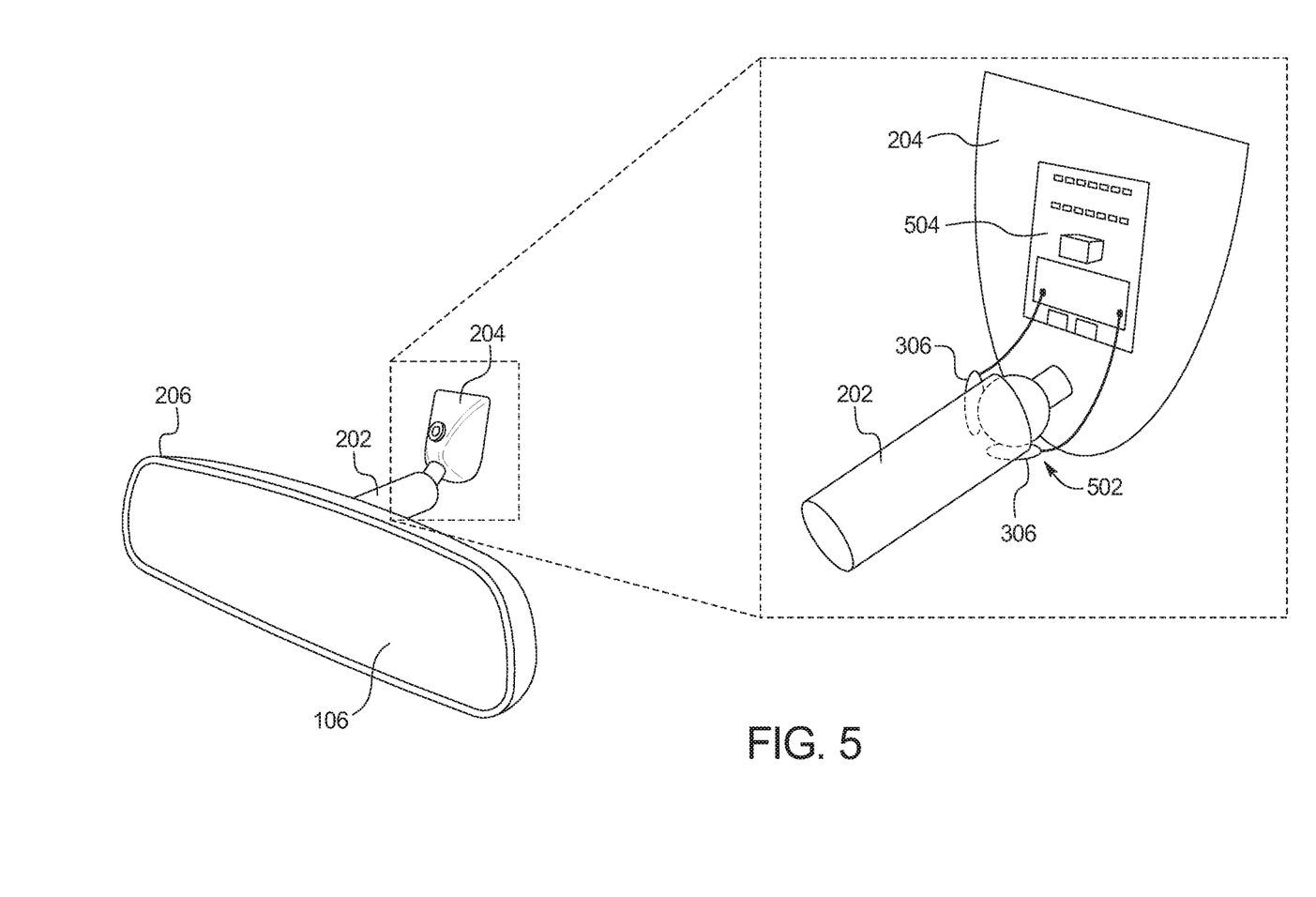
FIG. 5 illustrates another example rearview display system of the vehicle of FIG. 1.

FIG. 5 illustrates another example of the rearview display system 104 of the vehicle 100. In the illustrated example, the rearview display system 104 includes the rearview mirror display 106, the arm 202, the base 204, the display housing 206, and the sensors 306. The rearview mirror display 106, the arm 202, the base 204, the display housing 206, and the sensors 306 of FIG. 5 are identical and/or otherwise substantially similar to the rearview mirror display 106, the arm 202, the base 204, the display housing 206, and the sensors 306 of FIGS. 2-3B. Because those components are disclosed above in detail with respect to FIGS. 2-3B, some characteristics of those components will not be further disclosed below.

As illustrated in FIG. 5, the arm 202 is adjustable via a ball joint 502 that couples the arm 202 to the base 204. Further, the arm 202 is fixedly coupled to the rearview mirror display 106 and the display housing 206. As a result, an orientation and/or position of the rearview mirror display 106 is adjusted by adjusting the arm 202 via the ball joint 502.

In the illustrated example, the sensors 306 are electrically coupled to a circuit 504 that is coupled to the base 204 and is electrically coupled to the rearview controller 110. That is, the rearview controller 110 retrieves measurements of the sensors 306 via the circuit 504. Further, the sensors 306 of the illustrated example measure an orientation and/or rotation of the rearview mirror display 106 by monitoring the ball joint 502 and/or an orientation and/or rotation of the arm 202 relative to the base 204. The rearview controller 110 identifies, via one or more of the sensors 306, an orientation and/or rotation of the rearview mirror display 106 and adjusts the region-of-interest 406 that is presented via the rearview mirror display 106 based upon orientation and/or rotation of the rearview mirror display 106.

Figure 6:
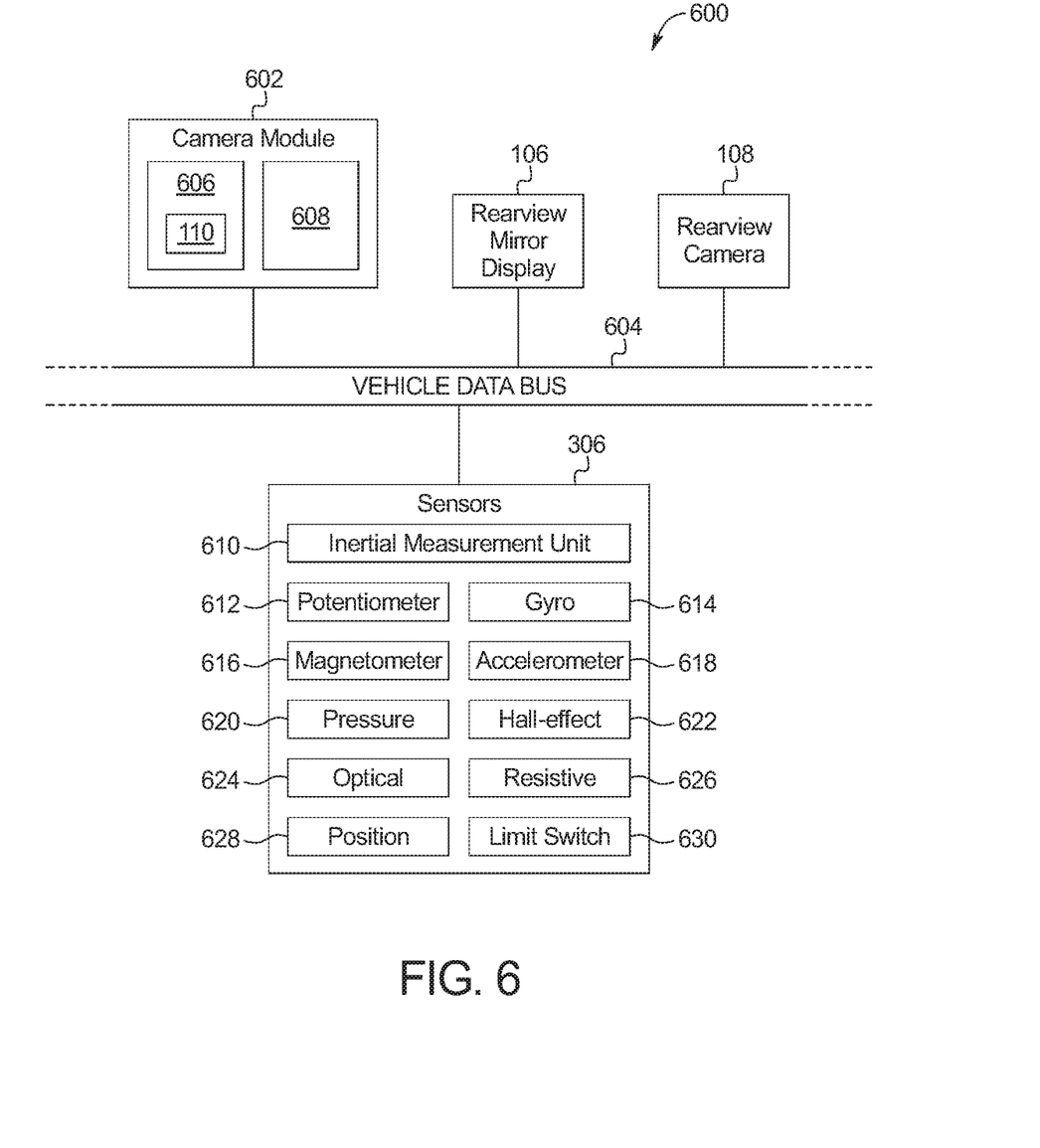
FIG. 6 is a block diagram of electronic components of the vehicle of FIG. 1.

FIG. 6 is a block diagram of electronic components 600 of the vehicle 100. As illustrated in FIG. 6, the electronic components 600 include a camera module 602, the rearview mirror display 106, the rearview camera 108, the sensors 306, and a vehicle data bus 604.

The camera module 602 controls one or more cameras of the vehicle (e.g., the rearview camera 108) to collect image(s) and/or video (e.g., the image 402) of a surrounding area of the vehicle 100. For example, the captured image(s) and/or video are presented to occupant(s) of the vehicle 100 (e.g., via the rearview mirror display 106) and/or are utilized to facilitate performance of autonomous and/or semi-autonomous driving maneuvers of the vehicle 100.

The camera module 602 of the illustrated example includes a microcontroller unit, controller or processor 606 and memory 608. In some examples, the processor 606 of the on camera module 602 is structured to include the rearview controller 110. Alternatively, in some examples, the rearview controller 110 is incorporated into another electronic control unit (ECU) with its own processor 606 and memory 608. The processor 606 may be any suitable processing device or set of processing devices such as, but not limited to, a microprocessor, a microcontroller-based platform, an integrated circuit, one or more field programmable gate arrays (FPGAs), and/or one or more application-specific integrated circuits (ASICs). The memory 608 may be volatile memory (e.g., RAM including non-volatile RAM, magnetic RAM, ferroelectric RAM, etc.), non-volatile memory (e.g., disk memory, FLASH memory, EPROMs, EEPROMs, memristor-based non-volatile solid-state memory, etc.), unalterable memory (e.g., EPROMs), read-only memory, and/or high-capacity storage devices (e.g., hard drives, solid state drives, etc). In some examples, the memory 608 includes multiple kinds of memory, particularly volatile memory and non-volatile memory.

The memory 608 is computer readable media on which one or more sets of instructions, such as the software for operating the methods of the present disclosure, can be embedded. The instructions may embody one or more of the methods or logic as described herein. For example, the instructions reside completely, or at least partially, within any one or more of the memory 608, the computer readable medium, and/or within the processor 606 during execution of the instructions.

The terms "non-transitory computer-readable medium" and "computer-readable medium" include a single medium or multiple media, such as a centralized or distributed database, and/or associated caches and servers that store one or more sets of instructions. Further, the terms "non-transitory computer-readable medium" and "computer-readable medium" include any tangible medium that is capable of storing, encoding or carrying a set of instructions for execution by a processor or that cause a system to perform any one or more of the methods or operations disclosed herein. As used herein, the term "computer readable medium" is expressly defined to include any type of computer readable storage device and/or storage disk and to exclude propagating signals.

The sensors 306 detect the orientation and/or rotation (i.e., change of orientation) of the rearview mirror display 106 and/or the display housing 206 to enable the rearview controller 110 to present the region-of-interest 406 via the rearview mirror display 106. In the illustrated example, the sensors 306 that monitor the rearview mirror display 106 and/or the display housing 206 include one or more of an inertial measurement unit 610, a potentiometer 612, a gyro sensor 614, a magnetometer 616, an accelerometer 618, a pressure sensor 620, a Hall-effect sensor 622, an optical sensor 624, a resistive sensor 626, a position sensor 628, and a limit switch 630.

Additionally, the vehicle 100 may include other sensors that are arranged in and around the vehicle 100 to monitor properties of the vehicle 100 and/or an environment in which the vehicle 100 is located. One or more of those sensors may be mounted to measure properties around an exterior of the vehicle 100. Additionally or alternatively, one or more of the sensors may be mounted inside a cabin of the vehicle 100 or in a body of the vehicle 100 (e.g., an engine compartment, wheel wells, etc.) to measure properties in an interior of the vehicle 100. For example, the sensors include accelerometers, odometers, tachometers, pitch and yaw sensors, wheel speed sensors, microphones, tire pressure sensors, biometric sensors and/or sensors of any other suitable type.

The vehicle data bus 604 communicatively couples the rearview mirror display 106, the rearview camera 108, the sensors 306, and the camera module 602. In some examples, the vehicle data bus 604 includes one or more data buses. The vehicle data bus 604 may be implemented in accordance with a controller area network (CAN) bus protocol as defined by International Standards Organization (ISO) 11898-1, a Media Oriented Systems Transport (MOST) bus protocol, a CAN flexible data (CAN-FD) bus protocol (ISO 11898-7) and/a K-line bus protocol (ISO 9141 and ISO 14230-1), and/or an Ethernet™ bus protocol IEEE 802.3 (2002 onwards), etc.

Figure 7:
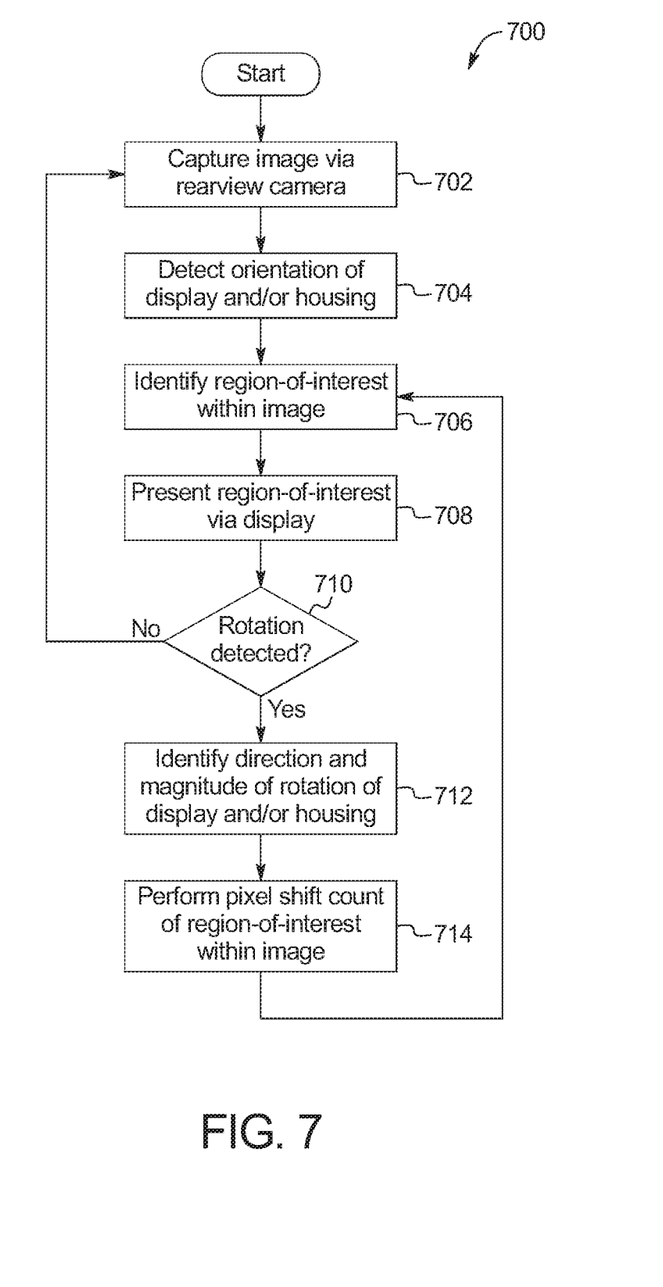
FIG. 7 is a flowchart for adjusting a display presented via a rearview mirror display of the vehicle of FIG. 1 in accordance with the teachings herein.

FIG. 7 is a flowchart of an example method 700 to adjust a region-of-interest presented via a rearview mirror display of a vehicle. The flowchart of FIG. 7 is representative of machine readable instructions that are stored in memory (such as the memory 608 of FIG. 6) and include one or more programs which, when executed by a processor (such as the processor 606 of FIG. 6), cause the vehicle 100 to implement the example rearview controller 110 of FIGS. 1 and 6. While the example program is described with reference to the flowchart illustrated in FIG. 7, many other methods of implementing the example rearview controller 110 may alternatively be used. For example, the order of execution of the blocks may be rearranged, changed, eliminated, and/or combined to perform the method 700. Further, because the method 700 is disclosed in connection with the components of FIGS. 1-6, some functions of those components will not be described in detail below.

Initially, at block 702, the rearview camera 108 captures image(s) and/or video (e.g., the image 402) of a surrounding area behind the vehicle 100. At block 704, one or more of the sensors 306 detects an orientation of the rearview mirror display 106 and/or the display housing 206. At block 706, the rearview controller 110 identifies the region-of-interest 406 within the image 402 captured by the rearview camera 108. For example, the rearview controller 110 determines a portion of the image 402 that forms the region-of-interest 406 based on the orientation of the rearview mirror display 106 and/or the display housing 206 detected via one or more of the sensors 306. At block 708, the rearview controller 110 presents the region-of-interest 406 via the rearview mirror display 106.

At block 710, the rearview controller 110 determines whether one or more of the sensors 306 has detected rotation (i.e., a change of orientation) of the rearview mirror display 106 and/or the display housing 206. In response to the rearview controller 110 not identifying rotation of the rearview mirror display 106 and/or the display housing 206, the method 700 returns to block 702 to continue to present the region-of-interest 406 via the rearview mirror display 106. Otherwise, in response to the rearview controller 110 identifying rotation of the rearview mirror display 106 and/or the display housing 206, the method 700 proceeds to block 712.

At block 712, the rearview controller 110 identifies, via measurements collected by one or more of the sensors 306, a direction (e.g., upward, downward, rightward, leftward, a combination thereof) and a magnitude (i.e., a degree) of rotation of the rearview mirror display 106 and/or the display housing 206. At block 714, the rearview controller 110 performs a pixel shift count of the region-of-interest 406 within the image 402 based on the magnitude and direction of rotation identified at block 712. For example, the rearview controller 110 pans the region-of-interest 406 in a direction within the image 402 that corresponds to the identified direction of rotation. That is, the rearview controller 110 pans the region-of-interest 406 upward within the image 402 responsive to detected upward rotation, downward within the image 402 responsive to detected downward rotation, rightward within the image 402 responsive to detected rightward rotation, and/or leftward within the image 402 responsive to detected leftward rotation. Further, in some examples, the shift count performed by the rearview controller 110 corresponds linearly to the identified magnitude of rotation. In other examples, the shift count performed by the rearview controller 110 corresponds non-linearly to the identified magnitude of rotation (e.g., the shift count increases exponentially with an increase in the degree of rotation). Upon the rearview controller 110 performing the pixel shift count at block 714, the method 700 returns to block 706 for the rearview controller 110 to identify the region-of-interest 406 to be presented via the rearview mirror display 106.

In this application, the use of the disjunctive is intended to include the conjunctive. The use of definite or indefinite articles is not intended to indicate cardinality. In particular, a reference to "the" object or "a" and "an" object is intended to denote also one of a possible plurality of such objects. Further, the conjunction "or" may be used to convey features that are simultaneously present instead of mutually exclusive alternatives. In other words, the conjunction "or" should be understood to include "and/or". The terms "includes," "including," and "include" are inclusive and have the same scope as "comprises," "comprising," and "comprise" respectively. Additionally, as used herein, the terms "module" and "unit" refer to hardware with circuitry to provide communication, control and/or monitoring capabilities, often in conjunction with sensors. A "module" and an "unit" may also include firmware that executes on the circuitry.

The above-described embodiments, and particularly any "preferred" embodiments, are possible examples of implementations and merely set forth for a clear understanding of the principles of the invention. Many variations and modifications may be made to the above-described embodiment(s) without substantially departing from the spirit and principles of the techniques described herein. All modifications are intended to be included herein within the scope of this disclosure and protected by the following claims.

What is claimed is:

1. A vehicle comprising:
 a rearview camera for capturing an image;
 a rearview mirror display positioned at a fixed orientation relative to the vehicle that is configured to present a portion of the image;
 a housing configured to rotate relative to the rearview mirror display, wherein the rearview mirror display is also positioned at the fixed orientation relative to the housing;
 a sensor to detect an orientation of the housing; and
 a controller to adjust, based upon a movement of the housing relative to the rearview mirror display, the portion of the image presented via the rearview mirror display, wherein the rearview mirror display is a fixed mirror display.

2. The vehicle of claim 1, wherein the rearview mirror display being positioned at the fixed orientation reduces a parallax effect of the portion of the image that is presented via the rearview mirror display.

3. The vehicle of claim 1, wherein the rearview mirror display being positioned at the fixed orientation reduces an amount of glare on the rearview mirror display.

4. The vehicle of claim 1, wherein the portion of the image presented via the rearview mirror display corresponds to a region-of-interest of a vehicle operator.

5. The vehicle of claim 4, wherein the image captured by the rearview camera includes pixels and the region-of-interest is formed by a portion of the pixels of the image.

6. The vehicle of claim 5, wherein, to adjust the portion of the image presented via the rearview mirror display, the controller performs a shift count of the portion of the pixels that form the region-of-interest.

7. The vehicle of claim 6, wherein the shift count performed by the controller corresponds linearly to a rotation of the housing measured by the sensor.

8. The vehicle of claim 6, wherein the shift count performed by the controller corresponds non-linearly to a rotation of the housing measured by the sensor.

9. The vehicle of claim 4, wherein the controller is to pan the region-of-interest in a direction within the image responsive to the sensor detecting that the housing has been rotated in the direction.

10. The vehicle of claim 1, further including a windshield and an arm that couples the rearview mirror display to the windshield at the fixed orientation.

11. The vehicle of claim 10, wherein the housing defines a first set of teeth and the arm defines a second set of teeth, the first set of teeth and a second set of teeth mesh together to enable the housing to rotate behind the rearview mirror display.

12. The vehicle of claim 10, wherein the housing couples to the arm, the housing is at least partially formed of flexible material, the flexible material engages the arm to enable the orientation of the housing to be adjusted relative to the rearview mirror display.

13. The vehicle of claim 10, wherein the sensor is coupled to the arm to detect the orientation of the housing relative to the rearview mirror display.

14. The vehicle of claim 1, wherein the sensor is coupled to the housing to detect the orientation of the housing relative to the rearview mirror display.

15. The vehicle of claim 1, wherein the sensor is selected from a group consisting of a pressure sensor, a limit switch, a Hall-effect sensor, an optical sensor, a resistive sensor, a position sensor, an inertial measurement unit, a potentiometer, a gyro sensor, a magnetometer, and an accelerometer.

16. A method comprising:
 capturing an image via a rearview camera;
 presenting a portion of the image via a rearview mirror display that is positioned at a fixed orientation;
 detecting, via a sensor, an orientation of a housing that is configured to rotate relative to the rearview mirror display, wherein the rearview mirror display is also positioned at the fixed orientation relative to the housing; and
 adjusting, via a processor, the portion of the image presented via the rearview mirror display based upon a movement of the housing relative to the rearview mirror display, wherein the rearview mirror display is a fixed mirror display.

17. The method of claim 16, wherein the portion of the image presented via the rearview mirror display corresponds to a region-of-interest of a vehicle operator that is formed by a portion of pixels of the image.

18. The method of claim 17, wherein adjusting the portion of the image presented via the rearview mirror display including performing a shift count of the portion of the pixels that form the region-of-interest.

19. The method of claim 18, wherein the shift count corresponds to a rotation of the housing measured by the sensor.

20. The method of claim 17, further including panning the region-of-interest in a direction within the image responsive to detecting, via the sensor, that the housing has been rotated in the direction.

\* \* \* \* \*